US008684610B2

(12) United States Patent
Nichols

(10) Patent No.: US 8,684,610 B2
(45) Date of Patent: Apr. 1, 2014

(54) CONNECTOR ASSEMBLIES HAVING ACTUATION MECHANISMS FOR SELECTIVELY MOVING MATING CONNECTORS

(75) Inventor: Robert Paul Nichols, Santa Rosa, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 352 days.

(21) Appl. No.: 13/051,373

(22) Filed: Mar. 18, 2011

(65) Prior Publication Data

US 2012/0237166 A1 Sep. 20, 2012

(51) Int. Cl.
*G02B 6/38* (2006.01)
*H01R 13/62* (2006.01)

(52) U.S. Cl.
USPC .......................................... 385/55; 439/296

(58) Field of Classification Search
None
See application file for complete search history.

(56) References Cited

U.S. PATENT DOCUMENTS 6,846,115 B1 * 1/2005 Shang et al. .................... 385/92
7,374,441 B2 5/2008 Rubenstein
7,473,039 B2 * 1/2009 Yi et al. .......................... 385/92
7,771,207 B2 8/2010 Hamner et al.

OTHER PUBLICATIONS

Strada Whisper* Connector System; Application Specification 114-13282; (c) Tyco Electronics Corporation; Nov. 4, 2010 Rev A; *Trademark. Other product names, logos, or company names might be trademarks of their respective owners; 16 pgs.

* cited by examiner

*Primary Examiner* — Sarah Hahm

(57) ABSTRACT

A connector assembly including an actuator body that extends along a central longitudinal axis between a pair of connector ends. The actuator body is movable along the longitudinal axis and has an actuator cam feature. The connector assembly also includes an assembly frame that is operatively coupled to the actuator body and is movable along a mating axis that is non-parallel relative to the longitudinal axis. The assembly frame defines a connector compartment and has a frame cam feature that is positioned to engage the actuator cam feature. The actuator and frame cam features slidably engage each other when the actuator body is moved along the longitudinal axis thereby moving the assembly frame along the mating axis. The connector assembly also includes a mating connector that is held by the assembly frame within the connector compartment. The assembly frame is configured to move the mating connector in a mating direction.

21 Claims, 7 Drawing Sheets

CONNECTOR ASSEMBLIES HAVING ACTUATION MECHANISMS FOR SELECTIVELY MOVING MATING CONNECTORS

BACKGROUND OF THE INVENTION

The subject matter herein relates generally to connector assemblies that are configured to communicatively couple different communication components through at least one of electrical and optical connections.

Some communication systems, such as servers, routers, and data storage systems, utilize connector assemblies for transmitting signals and/or power through the system. Such systems may include a midplane circuit board, a motherboard, and a plurality of daughter cards. The systems may also include one or more connectors attached to the motherboard that are configured to interconnect a daughter card to the motherboard when the daughter card is inserted into the system. The daughter card includes a receptacle assembly that has a mating face configured to engage a mating face of the connector. The receptacle assembly is generally positioned on or near a leading edge of the daughter card. Prior to being mated, the mating faces of the receptacle assembly and the connector are aligned with each other and face each other along an insertion axis. The daughter card is then moved along the insertion axis until the mating faces engage and the connector and receptacle assembly are mated.

However, in some cases, it may be desirable to mate the receptacle assembly and the connector by moving one or both in a mating direction that does not coincide with the insertion direction. By way of one example, the receptacle assembly may be on a surface of the daughter card and face a direction that is perpendicular to the insertion direction, and the connector may be on the motherboard/bridge card and also face a direction perpendicular to the insertion direction. In such a case, it may be difficult to properly align and mate the receptacle assembly and the connector. In addition to the above, other examples exist in communication systems where it may be difficult to properly align mateable connectors.

Accordingly, there is a need for a connector assembly that facilitates interconnection of communication components when the insertion direction (e.g., the direction in which the daughter card is inserted) is different from the mating direction (e.g., the direction in which the connector moves to engage another).

BRIEF DESCRIPTION OF THE INVENTION

In one embodiment, a connector assembly is provided that includes an actuator body that is configured to be slidably mounted to a support structure. The actuator body extends along a central longitudinal axis between a pair of connector ends. The actuator body is movable along the longitudinal axis and has an actuator cam feature. The connector assembly also includes an assembly frame that is operatively coupled to the actuator body and is movable along a mating axis that is non-parallel relative to the longitudinal axis. The assembly frame defines a connector compartment and has a frame cam feature. The frame cam feature is positioned to engage the actuator cam feature of the actuator body. The actuator and frame cam features slidably engage each other when the actuator body is moved along the longitudinal axis thereby moving the assembly frame along the mating axis. The connector assembly also includes a mating connector that is held by the assembly frame within the connector compartment. The assembly frame is configured to move the mating connector in a mating direction when the assembly frame is moved along the mating axis.

In another embodiment, a connector assembly is provided that includes an actuator body that is configured to be coupled to a support structure. The actuator body extends along a central longitudinal axis between a pair of connector ends. The actuator body has an actuator cam feature and is movable with respect to the support structure. The connector assembly also includes an assembly frame that is operatively coupled to the actuator body and is movable along a mating axis that is non-parallel relative to the longitudinal axis. The assembly frame defines a connector compartment and has a frame cam feature. The frame cam feature is positioned to engage the actuator cam feature of the actuator body. The actuator and frame cam features slidably engage each other when the actuator body is moved thereby moving the assembly frame along the mating axis. The connector assembly also includes a mating connector held by the assembly frame within the connector compartment. The assembly frame is configured to move the mating connector in a mating direction when the assembly frame is moved along the mating axis. The assembly frame includes a floating element that engages the mating connector and holds the mating connector in a biased position within the connector compartment. The floating element permits the mating connector to float from the biased position in a direction that is different from the mating direction.

DETAILED DESCRIPTION OF THE INVENTION

Figure 1:
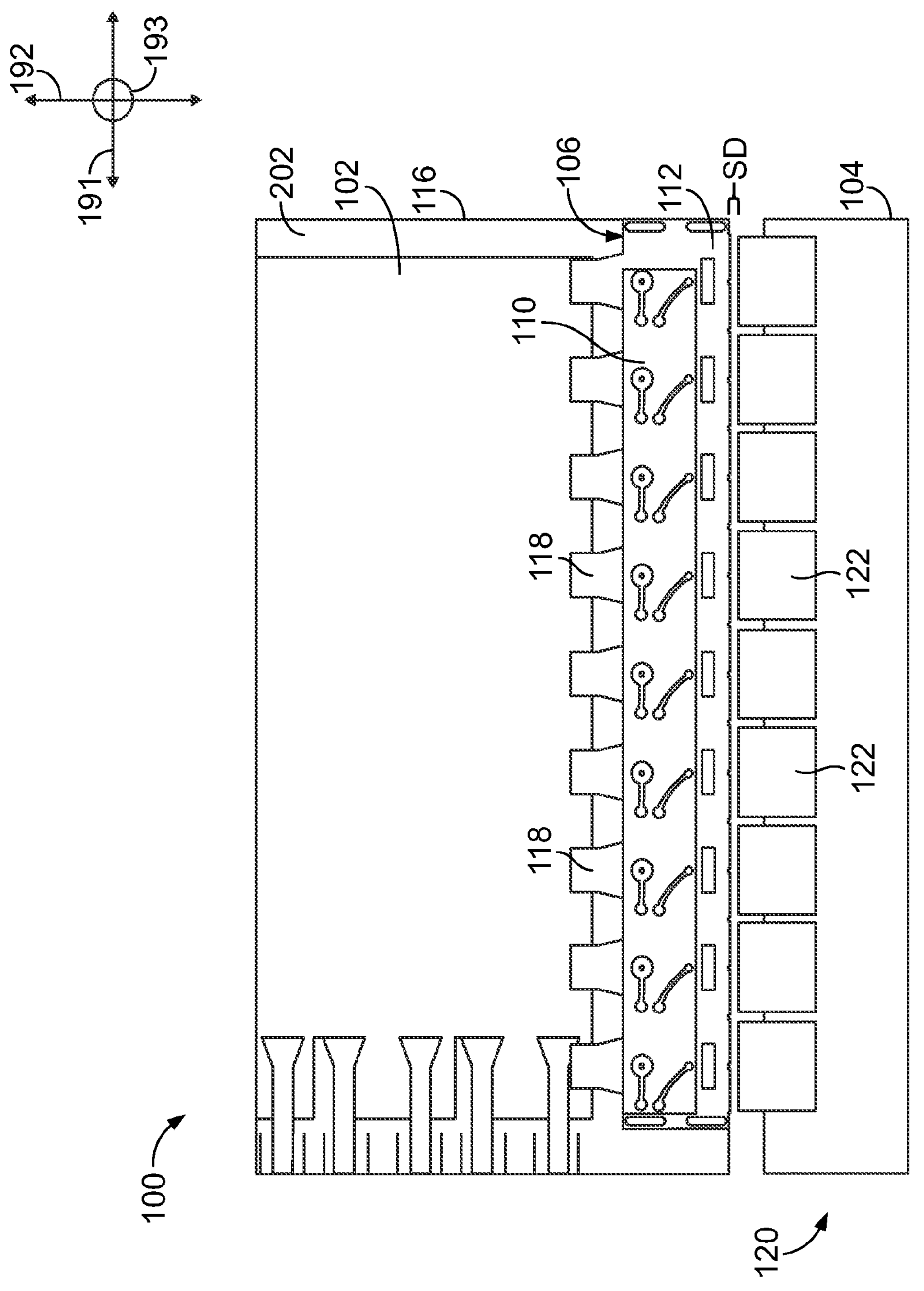
FIG. 1 is a side view of a communication system including a connector assembly formed in accordance with one embodiment.

Embodiments described herein include connector assemblies that are configured to establish at least one of an electrical and optical connection to transmit data signals between different communication components. Connector assemblies described herein may also establish an electrical connection to transmit power between the communication components. Communication components that may be interconnected by such connector assemblies include printed circuits (e.g., circuit boards or flex circuits), other connector assemblies (e.g., optical and/or electrical connector assemblies), and other components that are capable of establishing an electrical or optical connection. The connector assemblies can include one or more moveable elements in order to selectively move a mating connector toward a communication module. The communication module may be another connector, a communication component, or other components that are capable of establishing an electrical or optical connection. The mating connector may include a mating array (e.g., of electrical contacts or optical terminals) that are configured to engage a complementary array of the communication module to establish an electrical and/or optical connection.

Moreover, embodiments described herein may use cam features to transform a force in one direction to a force in another direction in order to move the mating connector. As used herein, the term "cam feature" includes a physical element having an engagement surface that is shaped in a predetermined manner with respect to another surface to move the mating connector along a predetermined path. Cam features may include channels, projection members, rods or pins, guide elements, edges, planar surfaces, and the like.

As used herein, the term "mating array" includes a plurality of electrical contacts and/or optical terminals that are arranged in a predetermined configuration. The contacts and/or terminals may be held in a fixed relationship with respect to each other and held together by a common structure (e.g., housing) or a base material. A variety of contacts may be used, including contacts that are stamped and formed, etched and formed, contact pads, and the like. In particular embodiments, the mating connector may include a housing that holds the mating array.

A "flex connection," as used herein, includes flexible pathways that are capable of transmitting electric current and/or optical signals. A flex connection may include at least one of an electrical conductor or a fiber optic communication line. For example, a flex connection may be a flexible circuit configured to convey current through conductors (e.g., conductive traces) that are embedded within a flexible substrate. Such a flexible circuit may transmit data and/or power. Furthermore, a flex connection may include one or more fiber optic communication lines (e.g., fiber optic cables) having optical waveguides that transmit light by total internal reflection. The optical waveguides may include a flexible cladding. The fiber optic cables may be configured to have a limited bend radius so that optical waveguides may transmit light. In addition, a flex connection may include electrical conductors (e.g., wires) that are configured to transmit power or signals therethrough.

FIG. 1 is a side view of a portion of a communication system 100 formed in accordance with one embodiment. As shown, the system 100 is oriented with respect to mutual perpendicular axes 191-193, including an insertion axis 191, a mating axis 192, and a lateral axis 193. The system 100 may include a first communication component 102 and a connector assembly 106 that is operatively coupled to the communication component 102. The system 100 may also include a support structure 116. The communication component 102 and the connector assembly 106 may be directly or indirectly coupled to the support structure 116. The support structure 116 may include spaced apart system walls 202 and 204 (FIG. 4) with the connector assembly 106 and the communication component 102 located therebetween. For illustrative purposes, only the system wall 202 is shown in FIG. 1.

The connector assembly 106 may include an actuator body 110 and an assembly frame 112 that are operatively coupled to each other. The actuator body 110 may extend along the insertion axis 191 and may be slidably mounted to the support structure 116 of the system 100. The assembly frame 112 also extends along the insertion axis 191 and is slidably mounted to the support structure 116. The connector assembly 106 is configured to hold a plurality of mating connectors 114 (shown in FIG. 3) that are communicatively coupled to the communication component 102. For example, the mating connectors 114 may be communicatively coupled to the communication component 102 through flex connections 118. The flex connections 118 permit the mating connectors 114 to be moved relative to the communication component 102.

The system 100 may be any one of a variety of communication systems, such as a server system, router system, data storage system, and the like. In the illustrated embodiment, the system 100 is configured to communicatively couple a second communication component 104 of a removable card assembly 120 to the first communication component 102. (Only a portion of the removable card assembly 120 is shown in FIG. 1.) The first and second communication components 102 and 104 are illustrated as printed circuits and, more specifically, as a motherboard and daughter card, respectively. However, embodiments described herein may be used to communicatively couple a variety of communication components (e.g., circuit boards, flex circuits, cables, other connectors, and the like).

In the illustrated embodiment, the removable card assembly 120 includes a plurality of communication modules 122 that are mounted to the second communication component 104. To communicatively couple the communication components 102 and 104, the removable card assembly 120 may be inserted and advanced in an insertion direction along the insertion axis 191 into the system 100. The system 100 may be configured to direct the removable card assembly 120 to a predetermined position with respect to the connector assembly 106 so that the communication modules 122 are spaced apart from corresponding mating connectors 114 by a separation distance SD. The connector assembly 106 is configured to move the mating connectors 114 in a mating direction along the mating axis 192 across the separation distance SD and mate the communication modules 122 with the corresponding mating connectors 114. In the exemplary embodiment, the mating direction is perpendicular to the insertion direction. However, embodiments described herein are not limited to mating directions that are perpendicular to the insertion direction. The connector assembly 106 may be configured differently than as shown such that the mating direction is non-perpendicular with respect to the insertion direction. For example, an alternative mating direction may form an angle of about any one of 45°, 60°, 75°, 105°, 120°, or 135° with respect to the insertion direction. Accordingly, embodiments described herein may move mating connectors in a mating direction that is non-parallel with respect to the insertion direction.

Figure 2:
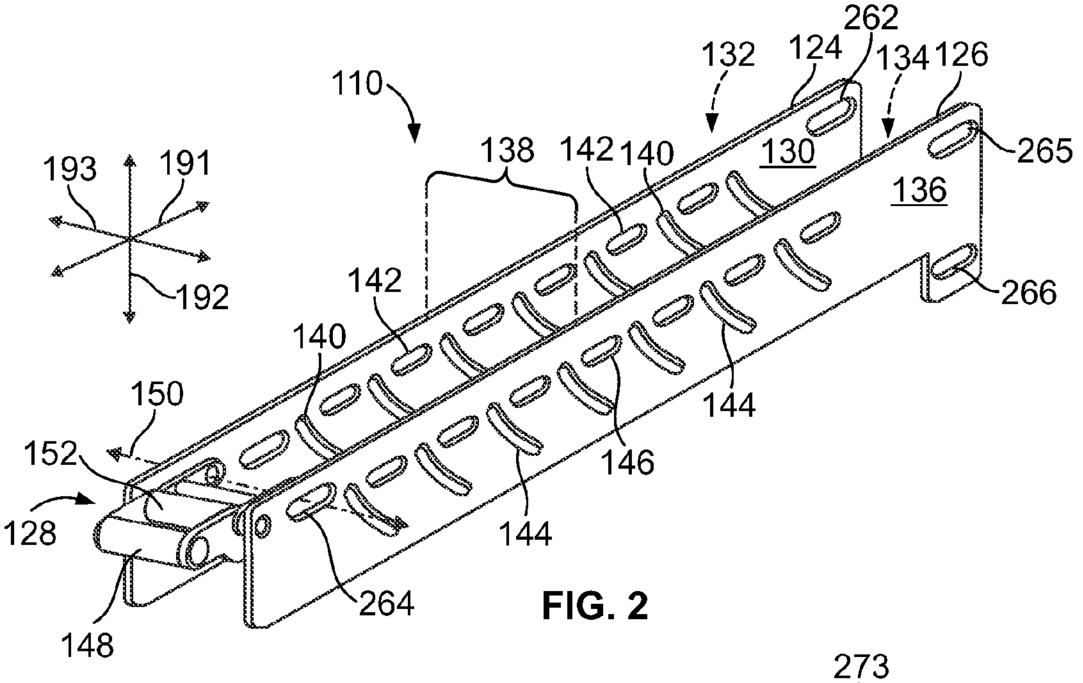
FIG. 2 is a perspective view of an actuator body that may be used in the connector assembly of FIG. 1.

FIG. 2 is an isolated perspective view of the actuator body 110. The actuator body 110 includes first and second plates 124 and 126 that are spaced apart from each other and also includes an operator handle 128 that extends between the plates 124 and 126. In the illustrated embodiment, the plates 124 and 126 have elongated planar bodies that extend parallel to each other and a plane that is defined by the mating and insertion axes 192 and 191. However, in other embodiments, the plates 124 and 126 may have different shapes and orientations. The plate 124 includes an inner surface 130 and an exterior surface 132, and the plate 126 includes an inner surface 134 and an exterior surface 136. The inner surfaces 130 and 134 oppose each other and have a frame-receiving space 138 therebetween.

The plates 124 and 126 may include various structural elements, e.g., cam features, that operatively couple the actuator body 110 to the assembly frame 112 (FIG. 1) and also to the support structure 116 (FIG. 1). For example, the plate 124 may include actuator cam features 140 and translating cam features 142 and 262. The translating cam features 142 and 262 are sized and shaped to engage corresponding cam features of the support structure 116 to move the actuator body 110 in a direction along the insertion axis 191 (hereinafter referred to as the "translating direction"). The actuator cam features 140 are sized and shaped to engage the assembly frame 112 to move the assembly frame 112 in the mating direction.

Similar to the plate 124, the plate 126 may include actuator cam features 144 and translating cam features 146 and 264-266. The translating cam features 146 and 264-266 are sized and shaped to engage corresponding cam features of the support structure 116 to move the actuator body 110 in the translating direction. The actuator cam features 144 are sized and shaped to engage corresponding cam features of the assembly frame 112 to move the assembly frame 112 in the mating direction.

In the illustrated embodiment, the actuator cam features 140 and 144 and the translating cam features 142, 262, 146, and 264-266 are channels that extend entirely through the respective plates 124 and 126. However, in other embodiments, the actuator cam features 140 and 144 and the translating cam features 142, 262, 146, and 264-266 may be channels (e.g., grooves) that do not extend through the plates 124 and 126. Furthermore, in alternative embodiments, the actuator cam features 140 and 144 and the translating cam features 142, 262, 146, and 264-266 may be projection members that are configured to engage channels in the assembly frame 112 and the support structure 116.

The actuator cam features 140 may be substantially evenly distributed with respect to each other along a length of the plate 124. The translating cam features 142 may also be substantially evenly distributed with respect to each other along the length of the plate 124. In the illustrated embodiment, the actuator and translating cam features 140 and 142 alternate with one another along a length of the plate 124 parallel to the insertion axis 191. Likewise, the actuator cam features 144 and the translating cam features 146 may be substantially evenly distributed with respect to each other along a length of the plate 126 in a similar manner. In the illustrated embodiment, the actuator and translating cam features 144 and 146 alternate with one another along a length of the plate 126 parallel to the insertion axis 191.

Figure 7:
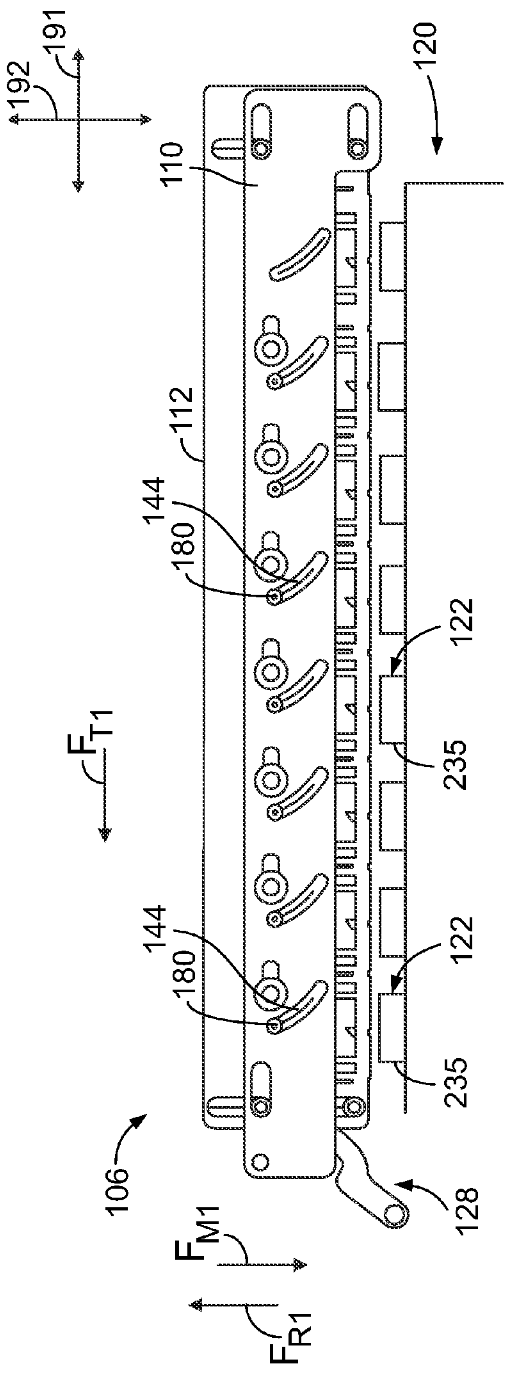
FIG. 7 is a side view of the connector assembly of FIG. 1 in a disengaged position.

Also shown in FIG. 2, the operator handle 128 extends between the inner surfaces 130 and 134 and is operatively coupled to the plates 124 and 126. The operator handle 128 is configured to be engaged by an individual or machine to move the actuator body 110 in the translating direction. For example, the operator handle 128 may include a rod 148 that is configured to be gripped or pinched by an individual's fingers. In other embodiments, the operator handle 128 may include a plurality of linkages (not shown) that extend away from the actuator body 110. The linkages may be engaged by an operator to move the operator handle 128. Furthermore, the operator handle 128 is configured to rotate about an axis of rotation 150 that extends parallel to the lateral axis 193. The operator handle 128 may rotate between a locked position as shown in FIG. 2 and an open (or unlocked) position as shown in FIG. 7. In the locked position, a locking member 152 that extends between the plates 124, 126 is gripped by the operator handle 128. Alternatively, plates 124 and 126 can be directly translated along the insertion axis 191 thereby removing the necessity of any additional linkage.

Figure 3:
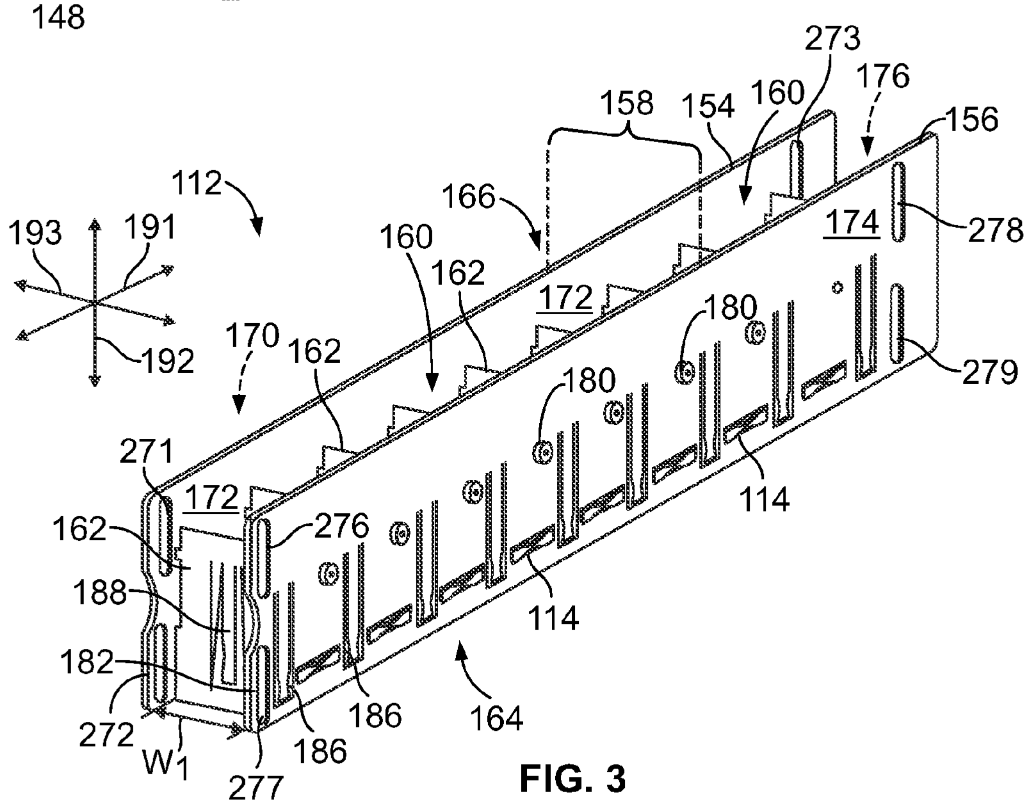
FIG. 3 is a perspective view of an assembly frame that may be used in the connector assembly of FIG. 1.

FIG. 3 is a perspective view of the assembly frame 112. The assembly frame 112 includes panels 154 and 156 that are separated from each other by a spacing 158. The panels 154 and 156 may comprise elongated planar bodies that extend parallel to each other and the plane defined by the insertion and mating axes 191 and 192. However, the panels 154 and 156 may have other shapes and orientations in alternative embodiments. As shown, the panel 154 has an outer surface 170 and an interior surface 172 that face in opposite directions, and the panel 156 has an outer surface 174 and an interior surface 176 that face in opposite directions. In the illustrated embodiment, the assembly frame 112 is configured to be located in the frame-receiving space 138 (FIG. 2) between the plates 124 and 126 (FIG. 2). As such, the assembly frame 112 may have a width $W_1$ measured between the outer surfaces 170 and 174 that permits the assembly frame 112 to be inserted between the plates 124 and 126 into the frame-receiving space 138.

As shown, the assembly frame 112 may define a plurality of connector compartments 160 within the spacing 158 between the panels 154 and 156. For example, the assembly frame 112 may include a plurality of sidewalls 162 that extend between the panels 154 and 156. The sidewalls 162 may extend parallel to a plane defined by the mating and lateral axes 192 and 193 and substantially perpendicular to the panels 154 and 156. In the illustrated embodiment, the panels 154 and 156 and the sidewalls 162 are stamped and formed from sheet material. In other embodiments, the panels 154 and 156 and the sidewalls 162 may be manufactured through other processes, e.g., molding or machining.

In particular embodiments, adjacent sidewalls 162 may have a corresponding one connector compartment 160 extending between the adjacent sidewalls 162. As such, each of the connector compartments 160 may comprise a rectangular-shaped space that is defined by the panels 154 and 156 and the adjacent sidewalls 162 that oppose each other across the space. The connector compartments 160 are configured to receive corresponding mating connectors 114 that may or may not be the same type of connector. In particular embodiments, each connector compartment 160 receives only one mating connector 114. However, in alternative embodiments, more than one mating connector 114 may be positioned within the connector compartment 160. Furthermore, in the illustrated embodiment, the connector compartments 160 are aligned in a series along the insertion axis 191.

As shown, the assembly frame 112 may have a mating face 164 and a loading side 166. The loading side 166 may open to an exterior of the connector assembly 106 (FIG. 1) and provide access to the connector compartments 160. For instance, during assembly the mating connectors 114 may be inserted into corresponding connector compartments 160 through the loading side 166. In the illustrated embodiment, the mating face 164 faces in the mating direction and the loading side 166 faces in an opposite direction along the mating axis 192. However, the loading side 166 may face other directions in alternative embodiments. For example, in one alternative embodiment, the mating connectors may be right-angle connectors. In such cases, the loading side 166 may face in a direction (e.g., in a direction along the lateral axis 193) that is perpendicular to the mating direction.

Similar to the plates 124 and 126, the panels 154 and 156 may include various structural elements, e.g., cam features, that operatively couple the assembly frame 112 to the actuator body 110 (FIG. 1) and also to the support structure 116 (FIG. 1). For example, the panel 156 may include frame cam features 180 and mating cam features 276-279. The frame cam features 180 are sized and shaped to slidably engage the actuator cam features 144 (FIG. 2) to move the assembly frame 112 in the mating direction. In the illustrated embodiment, the frame cam features 180 are projection members. The projection members may be sized and shaped relative to the actuator cam features 144. However, the frame cam features 180 may be other structural elements in other embodiments provided that the frame cam features cooperate with other cam features to move the assembly frame in the mating direction. The mating cam features 276-279 are sized and shaped to engage support members 224-227 (FIG. 5) and extend in the mating direction. In the illustrated embodiment, the mating cam features 276-279 are channels that extend completely through the panel 156. However, other cam features may be used.

The panel 154 also includes mating cam features 271-273. Although not shown, the panel 154 may also include frame cam features that may be similar to the frame cam features 180. Such frame cam features may also be sized and shaped to slidably engage corresponding actuator cam features 140 of the actuator body 110 to move the assembly frame 112 in the mating direction.

Also shown in FIG. 3, the panel 156 may have floating elements 186 and the sidewalls 162 may have floating elements 188. The floating elements 186 and 188 may be associated with corresponding connector compartments 160 such that the floating elements 186 and 188 engage the mating connectors 114 in the corresponding connector compartments 160 during operation of the connector assembly 106 (FIG. 1). The connector compartments 160 may be sized and shaped relative to the mating connector(s) 114 located therein to permit the mating connector(s) 114 to float with respect to the assembly frame 112. As will be described in greater detail below, the floating elements 186 and 188 may hold the mating connectors 114 in a biased position within the corresponding connector compartments 160 but permit the mating connectors 114 to float from the biased position in a direction that is different from the mating direction.

Figure 4:
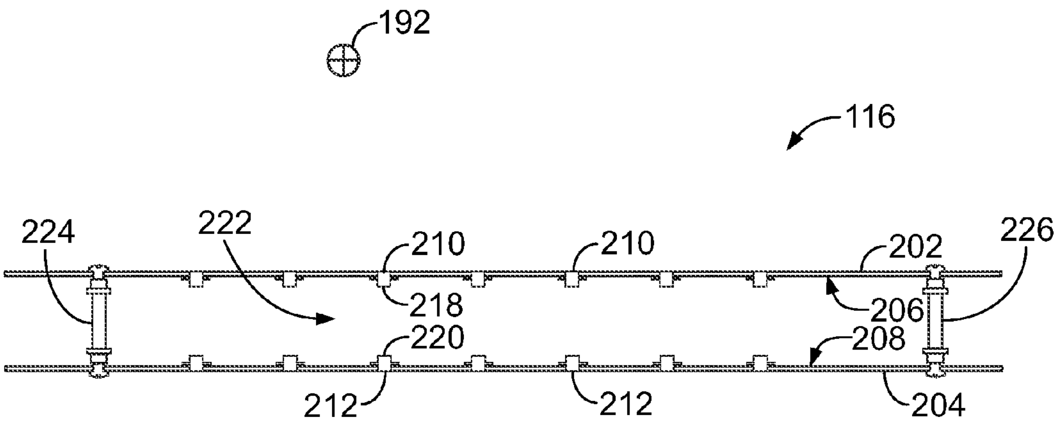
FIG. 4 is a plan view of a support structure that may hold the connector assembly of FIG. 1.
Figure 5:
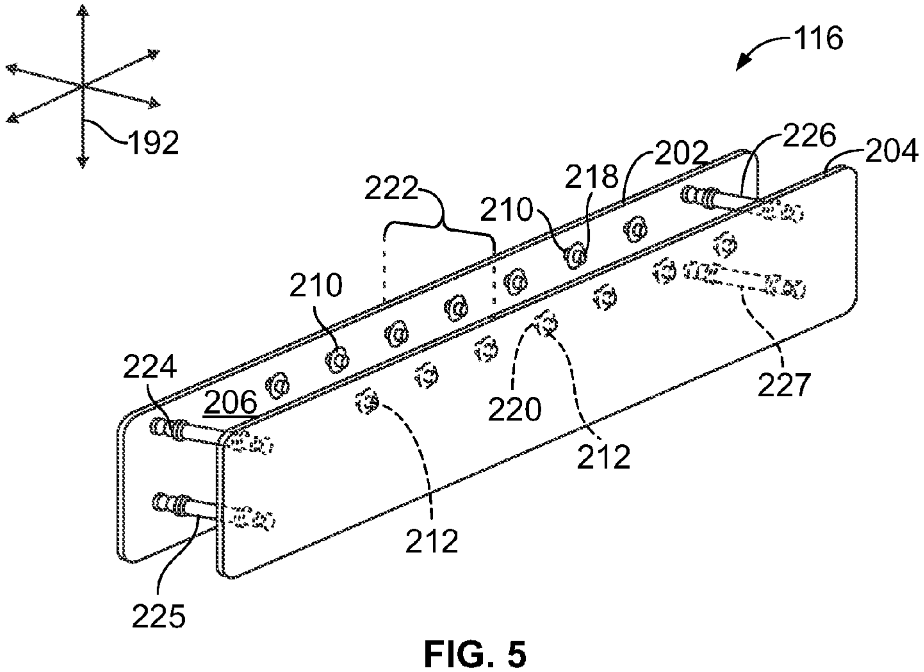
FIG. 5 is a perspective view of the support structure of FIG. 4.

FIG. 4 is an isolated view of the support structure 116 that is viewed along the mating axis 192, and FIG. 5 is an isolated perspective view of the support structure 116. In the illustrated embodiment, the support structure 116 comprises a pair of system walls 202 and 204 having respective support surfaces 206 and 208 (FIG. 4) that face each other. For illustrative purposes, only a portion of the system walls 202 and 204 are shown in FIGS. 4 and 5 and, as such, the system walls 202 and 204 may extend further and be used to support other components of the system 100 (FIG. 1). The support surfaces 206 and 208 oppose each other and define an assembly-receiving space 222 therebetween. The system walls 202 and 204 may comprise sheets of rigid material (e.g., metal, plastic, and the like). Although the system walls 202 and 204 are shown as planar sheets, the support structure 116 may comprise any structure capable of supporting the connector assembly 106 (FIG. 1) during operation. For example, the support structure 116 could include another component used in the system 100 (e.g., circuit board, heat sink) that opposes a sheet or wall or other component of the system 100. Furthermore, the support structure 116 may comprise only a single sheet or wall.

As shown, the support structure 116 may also include a plurality of guide elements 210 and 212 and support members 224-227. (The support members 225 and 227 are only shown in FIG. 5.) The guide elements 210 and 212 may constitute cam features that are secured to the system walls 202 and 204, respectively, and may be positioned to engage the translating cam features 142 and 146 (FIG. 2) of the actuator body 110 (FIG. 2). In particular embodiments, the guide elements 210 and 212 include projection members 218 and 220, respectively, that extend toward the opposing support surface. The projection members 218 and 220 are configured to slidably engage the translating cam features 142 and 146, respectively.

In the illustrated embodiment, the support members 224-227 include rods or pins that extend between and attach to the system walls 202 and 204. Similar to the guide elements 210 and 212, the support members 224-227 may constitute cam features that are secured to the system walls 202 and 204. In the illustrated embodiment, the support members 224-227 are stationary elements that operatively couple to the actuator body 110 and/or the assembly frame 112 (FIG. 3). The actuator body 110 and/or the assembly frame 112 may move with respect to the support members 224-227 during a mating operation.

Figure 6:
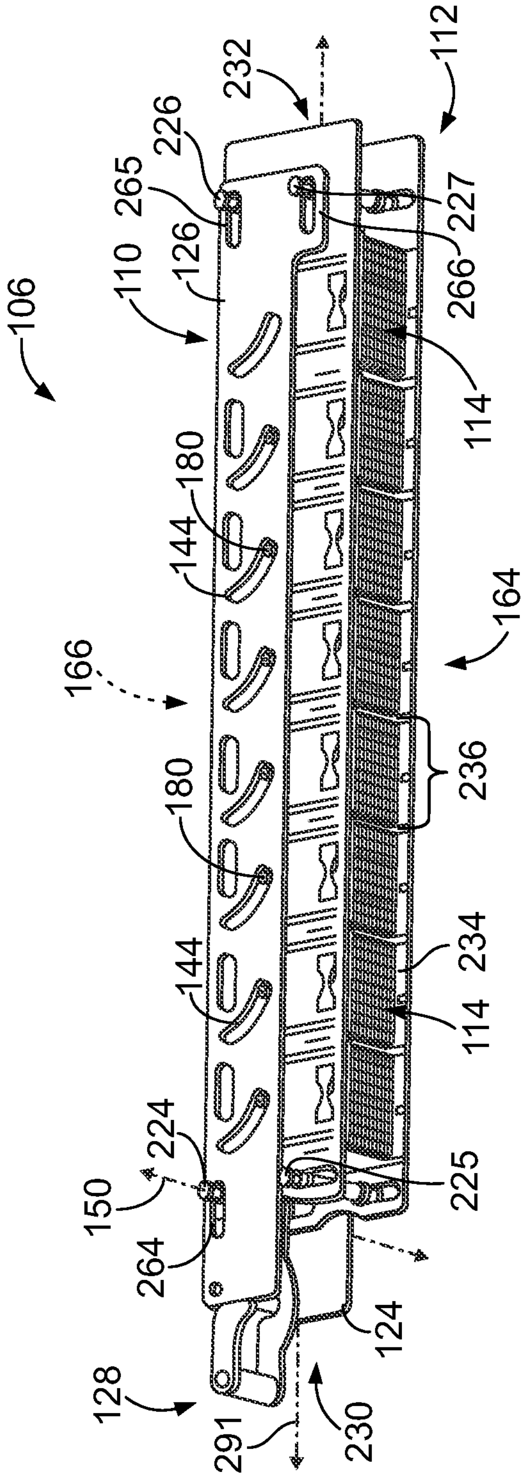
FIG. 6 is a perspective view of the connector assembly formed in accordance with one embodiment.

FIG. 6 is a perspective view of the connector assembly 106 showing the mating face 164 of the assembly frame 112. To construct the connector assembly 106, the plates 124 and 126 may be positioned with respect to the assembly frame 112 such that the translating cam features 262 (FIGS. 2) and 264-266 of the actuator body 110 are aligned with the corresponding mating cam features 271-273 and 276-279 (FIG. 3) of the assembly frame 112. The plates 124 and 126 may also be positioned with respect to the assembly frame 112 so that the frame cam features 180 are slidably engaged with actuator cam features 140 (FIG. 2) and 144. The operator handle 128 may be positioned between the plates 124 and 126. Once the actuator body 110 and the assembly frame 112 are positioned properly with respect to each other, the support members 224-227 may then be inserted through the corresponding translating and mating cam features. The support members may then be secured to the support structure 116 (FIG. 1) and, more specifically, the system walls 202 and 204 (FIG. 4). As shown, the axis of rotation 150 of the operator handle 128 extends through the support member 224.

As constructed, the connector assembly 106 includes a pair of connector ends 230 and 232 and has a central longitudinal axis 291 that extends between the connector ends 230 and 232. The longitudinal axis 291 may extend parallel to the insertion axis 191 (FIG. 1) when the connector assembly 106 is mounted to the support structure 116 (FIG. 1). Likewise, the mating axis 192 may be substantially perpendicular to the longitudinal axis 291. The actuator body 110 and the assembly frame 112 are operatively coupled to each other and also extend along the longitudinal axis 291 between the pair of connector ends 230 and 232.

Also shown, the plurality of mating connectors 114 are aligned with one another. In particular embodiments, the mating connectors 114 are modular such that the mating connectors 114 are assembled prior to being inserted through the loading side 166 into the corresponding connector compartments 160 (FIG. 3). The mating connector 114 may include a connector housing 234 and a mating array 236. The mating array 236 may include a plurality of electrical contacts having a predetermined arrangement. In particular embodiments, the mating contacts are disposed in corresponding sockets that are each configured to receive a pin contact from the communication module 122 (FIG. 1). The mating connectors 114 may be similar to STRADA Whisper connectors that are manufactured by Tyco Electronics.

Figure 8:
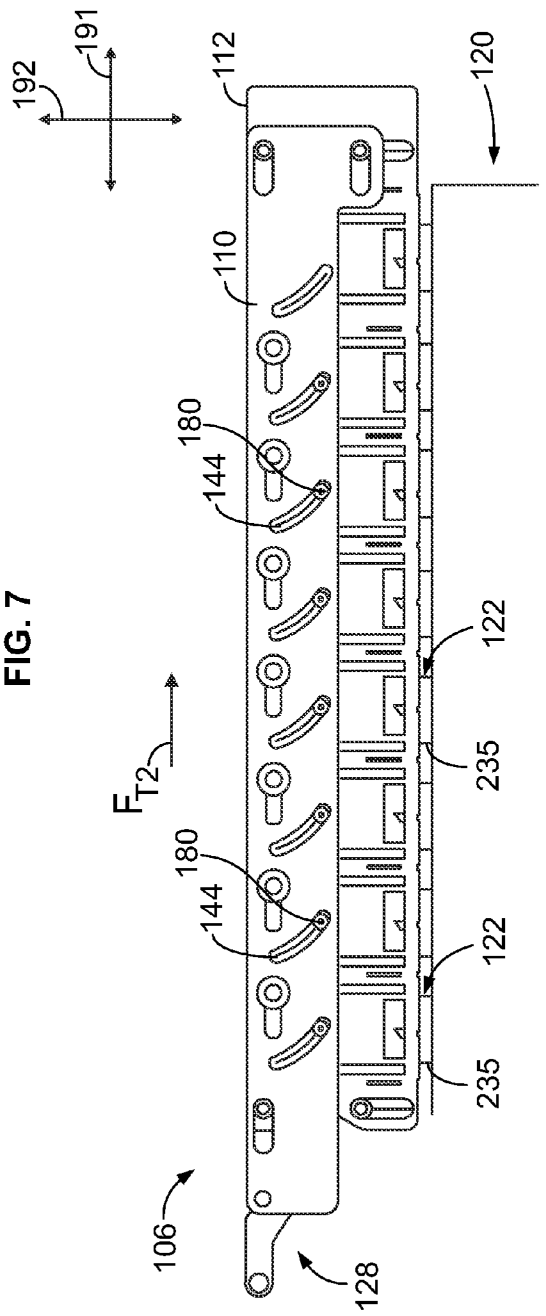
FIG. 8 is a side view of the connector assembly of FIG. 1 in an engaged position.

FIGS. 7 and 8 illustrate side views of the connector assembly 106 in a disengaged position (or a retracted position) and in an engaged position, respectively. In the disengaged position, the mating connectors 114 are held by the assembly frame 112. The removable card assembly 120 is inserted into the system 100 (FIG. 1) and advanced along the insertion axis 191 until the removable card assembly 120 reaches a predetermined position with respect to the connector assembly 106. As shown in FIG. 7, the operator handle 128 is in the open position. In the open position, the actuator body 110 is permitted to move along the insertion axis 191. For example, a translation force $F_{T1}$ (FIG. 7) may be applied that moves the actuator body 110 along the insertion axis 191 thereby moving the assembly frame 112 in the mating direction toward the engaged position. The assembly frame 112 moves between the plates 124 and 126 in the frame-receiving space 138 (FIG. 2). For example, the outer surfaces 170 and 174 (FIG. 3) may interface with and slide alongside the inner surfaces 130 and 134 (FIG. 2), respectively. In the illustrated embodiment, the translation force $F_{T1}$ for moving the assembly frame 112 to the engaged position is provided by pulling the actuator body 110 toward, for example, the operator. A translation force $F_{T2}$ (FIG. 8) for moving the assembly frame 112 to the disengaged position is provided by pushing the actuator body 110. However, in other embodiments, the actuator body 110 may be configured to be pushed to move the assembly frame 112 into the engaged position and pulled to move the assembly frame 112 to the disengaged position.

The frame and actuator cam features 180 and 140, 144 cooperate with one another to transform the translation force $F_{T1}$ into a mating force $F_{M1}$ (FIG. 7). In the illustrated embodiment, as the mating connectors 114 (FIG. 3) engage the communication modules 122, frictional forces (indicated by the arrow $F_{R1}$) may resist engagement in the mating direction. The frictional forces $F_{R1}$ may be provided by, for example, surfaces of the connector housing 234 (FIG. 6) engaging surfaces of a module housing 235 or surfaces of the electrical contacts in the mating array 236 (FIG. 6) engaging the module housing 235 or electrical contacts of the communication modules 122. In such embodiments, the mating force $F_{M1}$ is configured to exceed the frictional forces $F_{R1}$ to mate the mating connectors 114 and the corresponding communication modules 122.

Figure 9:
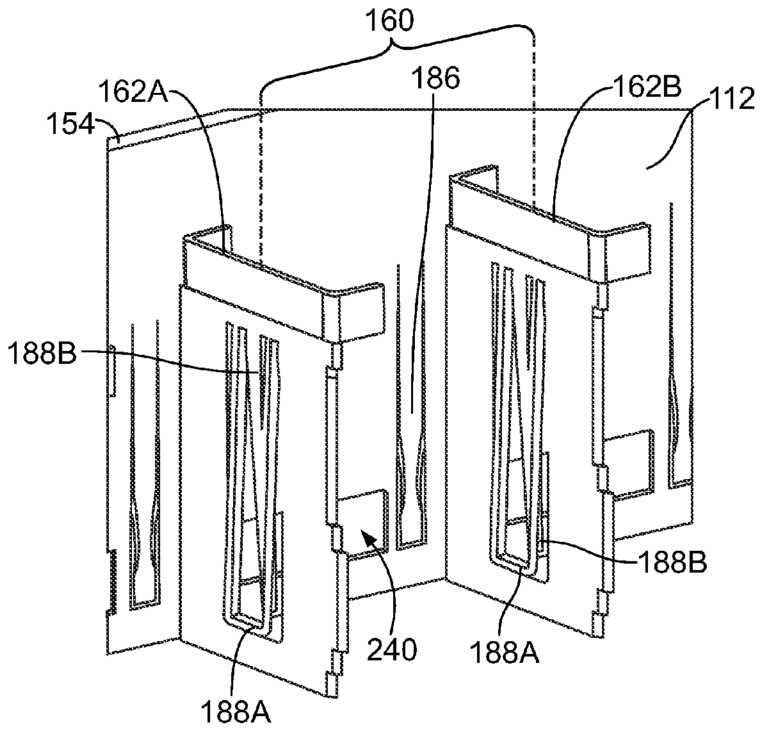
FIG. 9 is an enlarged and exposed view of a connector compartment of the connector assembly of FIG. 1.

FIG. 9 is an enlarged and exposed view of the connector compartment 160. In the illustrated embodiment, the connector compartment 160 is at least partially defined by the adjacent sidewalls 162A-B and the panels 154 and 156 (FIG. 3). In some embodiments, the sidewalls 162A-B and the panels 154 and 156 include various features configured to facilitate retaining the corresponding mating connector 114 (FIG. 3) in the connector compartment 160. In particular embodiments, the retaining features may also permit the mating connector 114 to float within the connector compartment 160 relative to the assembly frame 112. For example, the panel 154 includes an opening 240 that extends through the panel 154 into an exterior of the connector assembly 106 (FIG. 1). The panel 154 also includes a plurality of floating elements 186.

Furthermore, each of the sidewalls 162A and 162B may include floating elements 188A-B. The floating elements 188A-B of one sidewall 162 are configured to engage different mating connectors 114 in adjacent connector compartments 160. For example, the floating element 188A of one sidewall 162 may be biased such that the floating element 188A extends into a first connector compartment 160, and the floating element 188B from the same sidewall 162 may be biased such that the floating element 188B extends into a second connector compartment that is adjacent to the first connector compartment. In other words, adjacent mating connectors 114 may be separated by a common sidewall 162 that has floating elements 188A-B in which one floating element 188A engages one mating connector 114 and the other floating element 188B engages the other mating connector 114.

In the illustrated embodiment, the floating elements 186 and 188A-B are resilient fingers. The resilient fingers may be stamped and formed from material that forms the corresponding sidewall or panel. The resilient fingers may also be molded or formed in another manner. Furthermore, other floating elements may be used instead of resilient fingers. For example, the floating elements 186 and/or 188 may include springs.

Figure 10:
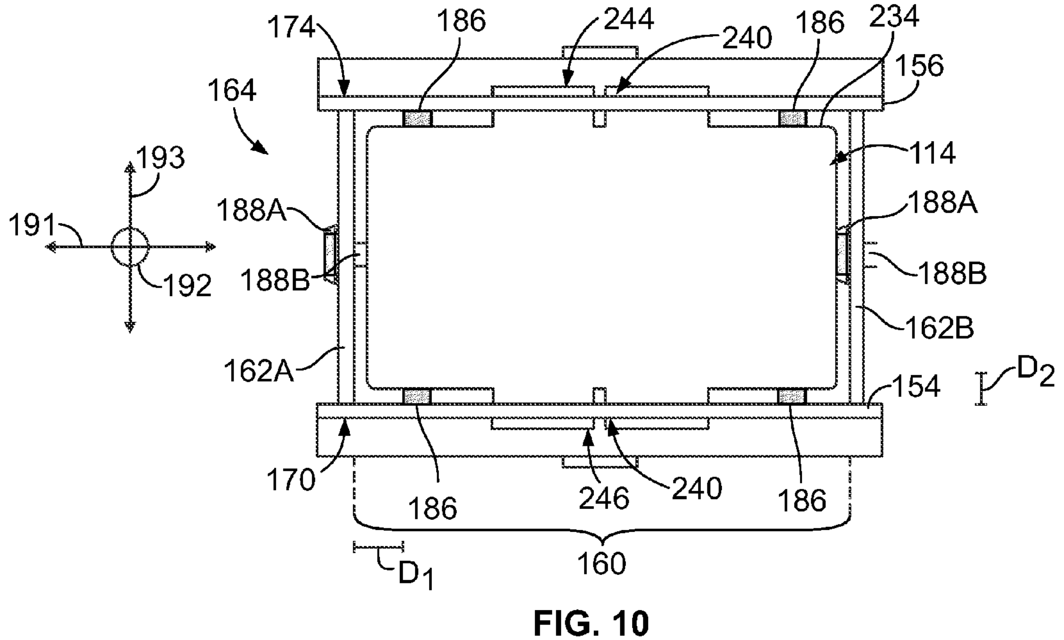
FIG. 10 is an enlarged view of the mating face of the connector assembly of FIG. 1.

FIG. 10 is a view of a portion of the mating face 164 viewed along the mating axis 192. The mating connector 114 is located within the connector compartment 160. In some embodiments, the connector housing 234 may have engagement features 244 and 246. The engagement features 244 and 246 may be configured to be inserted through corresponding openings 240 of the panels 154 and 156. The engagement features 244 and 246 extend beyond the outer surfaces 170 and 174 of the panels 154 and 156. The openings 240 are sized and shaped relative to the engagement features 244 and 246 to permit the mating connector 114 to float within the connector compartment 160. For example, the mating connector 114 may be permitted to float along the insertion axis 191 a distance $D_1$ between the sidewalls 162A and 162B, and the mating connector 114 may be permitted to float along the lateral axis 193 a distance $D_2$ between the panels 154 and 156.

Also shown, the floating element 188A of the sidewall 162B, the floating element 188B of the sidewall 162A, and the floating elements 186 of the panels 154 and 156 are configured to engage the mating connector 114 in the connector compartment 160 and hold the mating connector 114 in a biased position. The biased position of the mating connector 114 is shown in FIG. 10. The floating elements 188A-B and 186 permit the mating connector 114 to move in a non-mating direction along a plane defined by the insertion and lateral axes 191 and 193. For example, when the mating connector 114 engages the corresponding communication module 122 in a misaligned manner, structural features of the connector housing 234 and the module housing 235 may provide forces in a direction other than the mating direction. The floating elements 188A-B and 186 permit the mating connector 114 to float relative to the assembly frame 112 so that the mating connector 114 and the communication module 122 may mate with each other.

Figure 11:
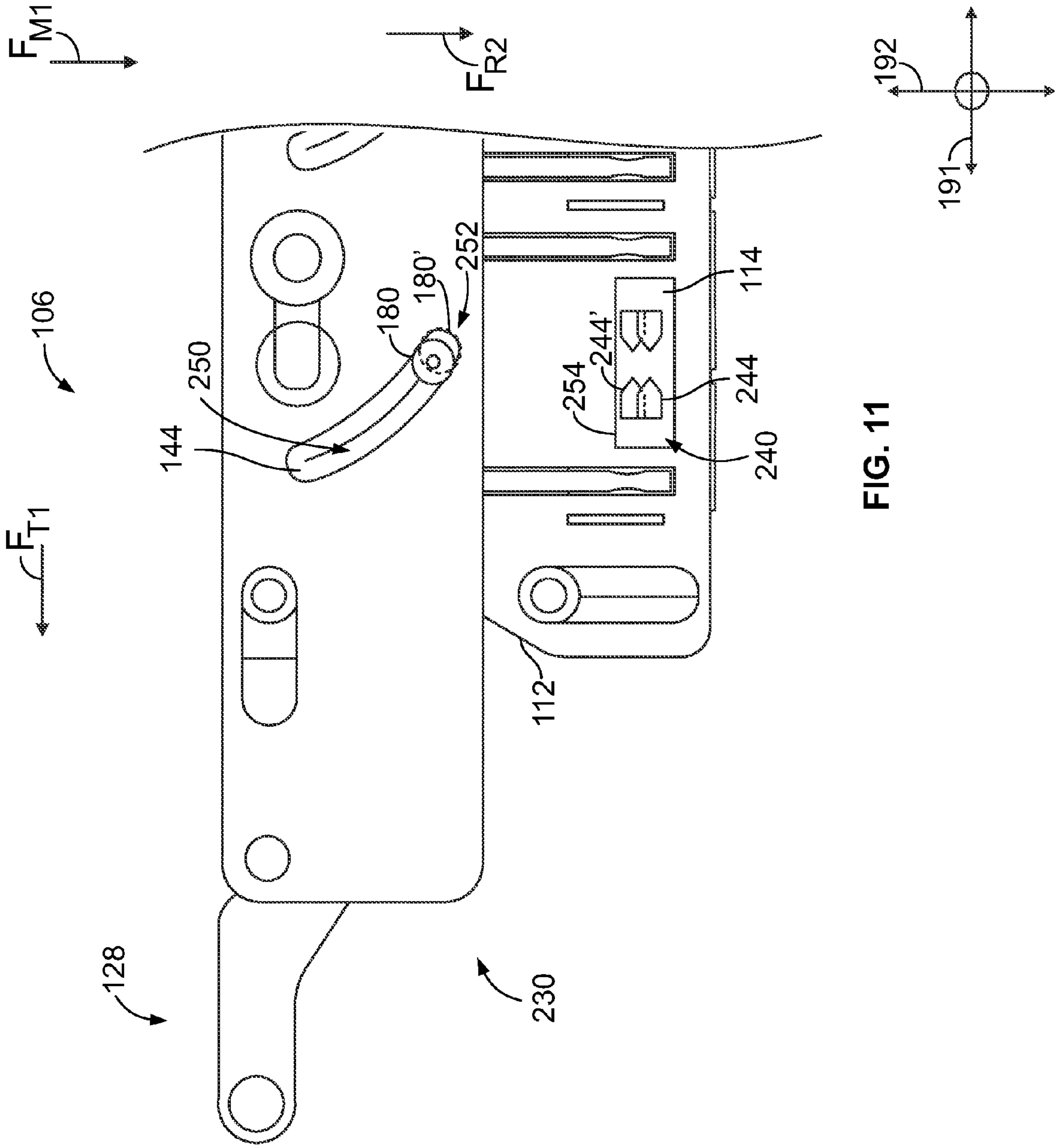
FIG. 11 is an enlarged view of a connector end of the connector assembly of FIG. 1.

FIG. 11 is an enlarged view of the connector end 230 and illustrates an interaction between different elements of the connector assembly 106 in greater detail when the mating connectors 114 and communication modules 122 (FIG. 1) are electrically and mechanically coupled. In some embodiments, it may be desirable to release or remove the mating force $F_{M1}$ after the mating connectors 114 and the communication modules 122 are mated. By removing the mating force $F_{M1}$, the stress sustained by the connector assembly 106 and the communication modules 122 during operation may be reduced and, as such, may possibly increase a lifetime of the connector assembly 106. To this end, the various parts of the connector assembly 106 described above may be provided with tolerances that remove the mating force $F_{M1}$ after the mating connectors 114 and communication modules 122 are electrically and mechanically coupled.

As shown in FIG. 11, the actuator cam feature 144 directs the frame cam feature 180 along a path 250 when the translation force $F_{T1}$ is provided. In the illustrated embodiment, the path 250 has two different slopes with respect to the insertion axis 191. In other embodiments, the path 250 may have only one slope or more than two slopes. A slope of the path 250 corresponds to a force and speed that the assembly frame 112 is moved along the mating axis 192. As such, the assembly frame 112 carrying the mating connector 114 approaches the communication module 122 at a first speed and force during a first portion of the path 250 and then at a second slower speed higher force during a second portion of the path 250. Thus, the actuator and frame cam features 144 and 180 may be shaped to move the assembly frame 112 at different speeds and apply different forces along the mating axis 192.

As shown, the path 250 has a path end 252 that prevents the frame cam feature 180 from moving further. When the translation force $F_{T1}$ is applied and the assembly frame 112 has been fully extended into the engaged position, the frame cam feature (indicated as 180') may be pressed against the path end 252 as indicated by the dashed circle in FIG. 11. At or about this time, the engagement feature 244 of the mating connector 114 may be pressed against or proximate to a positive stop 254 (e.g., edge of the opening 240) of the assembly frame 112. In this position, the mating connector 114 may be pressing directly against the communication module 122 with the mating force $F_{M1}$.

In some embodiments, when the translation force $F_{T1}$ is removed, dimensions of the operator handle 128, the actuator and cam features 144 and 180, the positive stop 254, and/or the engagement features 244 may provide tolerances that permit the mating connector 114 to release the mating force $F_{M1}$ against the communication module 122. For example, the frame cam feature may move from a pressed position (indicated at 180') to a released position (indicated at 180). Furthermore, the engagement feature may move from a pressed position (indicated at 244') to a released position (indicated at 244). In such embodiments, the electrical and mechanical connection may be maintained without the mating force $F_{M1}$. For example, the frictional forces between the mating connectors 114 and the communication modules 122 may operate to resist movement of the mating connectors 114 away from the communication modules 122 (as indicated by the arrow $F_{R2}$) and thereby maintain the electrical and mechanical connection of the mating connectors 114 and the corresponding communication modules 122. In other words, the interference fit between the communication module 122 and the mating connector 114 may prevent the mating connector 114 from inadvertently disengaging (e.g., due to shock, vibration, gravity) with the corresponding communication module 122 during operation of the system 100 (FIG. 1).

It is to be understood that the above description is intended to be illustrative, and not restrictive. For example, in the illustrated embodiment, the mating axis 192 extends perpendicular to the insertion axis 191 and the lateral axis 193. However, embodiments described herein may be configured to move the mating connectors along axes that are non-parallel with respect to the insertion axis 191. For example, the various cam features of the connector assembly 106 may be configured to move mating connectors 114 in any direction along the plane defined by the axes 191 and 192 as shown in FIG. 1. (In such embodiments, the axis 192 may be characterized as an orientation axis.) Accordingly, the mating axis may extend in a non-orthogonal manner with respect to the insertion axis 191.

Furthermore, in the exemplary embodiment, the actuator body 110 is moved in a substantially linear manner to provide the mating force $F_{M1}$ that drives the mating connectors 114. However, in other embodiments, the actuator body 110 is not moved in a linear manner. For example, an alternative actuator body may be rotated about an axis of rotation to move the assembly frame and thereby provide a mating force. As a specific example, the actuator body may comprise an axle that rotates about an axis of rotation and has a projection member that projects radially away from the axis of rotation in a non-uniform manner. The non-uniform shape of the projection member may determine the amount of distance traversed by the mating connector. Other camming mechanisms may be used to provide the mating force.

In addition, the above-described embodiments (and/or aspects thereof) may be used in combination with each other. Furthermore, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly comprising:

an actuator body configured to be slidably mounted to a support structure, the actuator body extending along a central longitudinal axis between a pair of connector ends, the actuator body being movable along the longitudinal axis and having an actuator cam feature;

an assembly frame being operatively coupled to the actuator body and movable along a mating axis that is nonparallel relative to the longitudinal axis, the assembly frame defining a connector compartment and having a frame cam feature, the frame cam feature being positioned to engage the actuator cam feature of the actuator body, the actuator and frame cam features slidably engaging each other when the actuator body is moved along the longitudinal axis thereby moving the assembly frame along the mating axis; and a mating connector held by the assembly frame within the connector compartment, wherein the assembly frame is configured to move the mating connector in a mating direction when the assembly frame is moved along the mating axis, wherein, as the actuator body is moved along the longitudinal axis the actuator and frame cam features provide a mating force that drives the mating connector into a communication module to communicatively couple the mating connector and the communication module;

wherein, while the mating connector and the communication module are communicatively coupled, the frame cam feature is permitted to move relative to the actuator body to remove the mating force, the mating connector and the communication module remaining communicatively coupled after the mating force is removed.

2. The connector assembly of claim 1, wherein the assembly frame permits the mating connector to float in a direction that is different than the mating direction.

3. The connector assembly of claim 1, wherein the actuator cam feature comprises a channel and the frame cam feature comprises a projection member sized and shaped to slidably engage the channel.

4. The connector assembly of claim 1, wherein the assembly frame comprises a floating element that engages the mating connector and holds the mating connector within the connector compartment in a biased position, the floating element permitting the mating connector to float within the connector compartment from the biased position.

5. The connector assembly of claim 4, wherein the floating element comprises a plurality of resilient fingers.

6. The connector assembly of claim 1, wherein the actuator body comprises first and second plates spaced apart from each other, the assembly frame being located between the first and second plates.

7. The connector assembly of claim 1, wherein the assembly frame includes a mating face and an open loading side, the mating face configured to face in the mating direction, the loading side providing access to the connector compartment, the mating connector having a flex connection that extends through the loading side and that permits the mating connector to float with respect to the assembly frame.

8. The connector assembly of claim 1, further comprising an operator handle coupled to the actuator body that is configured to be engaged by an operator for moving the actuator body, wherein the operator handle moves relative to the actuator cam feature when the operator handle is moved between locked and unlocked positions, the actuator body being movable along the longitudinal axis when the operator handle is in the unlocked position, the operator handle configured to couple to a locking member of the support structure.

9. The connector assembly of claim 1, wherein the actuator and frame cam features are shaped to move the assembly frame at different speeds and apply different forces along the mating axis.

10. The connector assembly of claim 1, wherein the mating axis is substantially perpendicular to the longitudinal axis.

11. The connector assembly of claim 1, wherein a translation force is configured to move the actuator body along the longitudinal axis, the actuator and frame cam features transforming the translation force into the mating force that drives the mating connector in the mating direction.

12. The connector assembly of claim 1, wherein the mating connector has a connector housing that includes an engagement feature and the assembly frame has a positive stop, the positive stop pressing against the engagement feature as the mating connector is driven by the mating force, wherein the positive stop is permitted to float away from the engagement feature after the mating force is removed, the mating connector and the communication module remaining communicatively coupled after the positive stop floats away.

13. , A connector assembly comprising:

an actuator body configured to be slidably mounted to a support structure, the actuator body extending along a central longitudinal axis between a air of connector ends the actuator body being movable along the longitudinal axis and having an actuator cam feature;

an assembly frame being operatively to the actuator body and movable along a mating axis that is non-parallel relative to the longitudinal axis, the assembly frame defining a connector compartment and having a frame cam feature, the frame cam feature being positioned to engage the actuator cam feature of the actuator body, the actuator and frame cam features slidably engaging each other when the actuator body is moved along the longitudinal axis thereby moving the assembly frame along the mating axis; and a mating connector held by the assembly frame within the connector compartment, wherein the assembly frame is configured to move the mating connector in a main direction when the assembly frame is moved along the mating axis;

wherein the connector compartment includes a plurality of connector compartments and the mating connector includes a plurality of mating connectors held within the corresponding connector compartments, the mating connectors being independently movable with respect to one another within the corresponding connector compartments.

14. The connector assembly of claim 13, wherein the assembly frame includes a sidewall that separates adjacent first and second connector compartments of the plurality of connector compartments, wherein the sidewall includes a first floating element that extends into the first connector compartment and a second floating element that extends into the second floating compartment, the first and second floating elements engaging respective mating connectors of the plurality of mating connectors.

15. The connector assembly of claim 13, wherein the assembly frame includes a mating face and an open loading side, the mating face configured to face in the mating direction, the loading side providing access to the connector compartments, the mating connectors having flex connections that extend through the loading side and that permit the corresponding mating connectors to float with respect to the assembly frame.

16. A connector assembly comprising:

an actuator body configured to be coupled to a support structure, the actuator body extending along a central longitudinal axis between a pair of connector ends, the actuator body having an actuator cam feature and being movable with respect to the support structure;

an assembly frame being operatively coupled to the actuator body and movable along a mating axis that is non-parallel relative to the longitudinal axis, the assembly frame defining a connector compartment and having a frame cam feature, the frame cam feature being positioned to engage the actuator cam feature of the actuator body, the actuator and frame cam features slidably engaging each other when the actuator body is moved thereby moving the assembly frame along the mating axis; and a mating connector held by the assembly frame within the connector compartment, the assembly frame being configured to move the mating connector in a mating direction when the assembly frame is moved along the mating axis;

wherein the assembly frame comprises a floating element that engages the mating connector and holds the mating connector in a biased position within the connector compartment, the floating element permitting the mating connector to float from the biased position in a direction that is different than the mating direction.

17. The connector assembly of claim 16, wherein the floating element comprises a plurality of resilient fingers.

18. The connector assembly of claim 16, wherein the connector compartment includes a plurality of connector compartments and the mating connector includes a plurality of mating connectors held within the corresponding connector compartments that are engaged by corresponding floating elements, the mating connectors being independently movable with respect to one another within the corresponding connector compartments.

19. The connector assembly of claim 16, wherein the mating connector comprises two adjacent mating connectors that are separated by a common sidewall of the assembly frame, the common sidewall having the floating element, the floating element comprising two floating elements that each engage a corresponding one of the two adjacent mating connectors.

20. The connector assembly of claim 16, wherein a translation force is configured to move the actuator body along the longitudinal axis, the actuator and frame cam features transforming the translation force into a mating force that drives the mating connector in the mating direction.

21. The connector assembly of claim 16, wherein the assembly frame includes a mating face and an open loading side, the mating face configured to face in the mating direction, the loading side providing access to the connector compartment, the mating connector having a flex connection that extends through the loading side and that permits the mating connector to float with respect to the assembly frame.

* * * * *